United States Patent
Miyoshi (10) Patent No.: US 8,292,430 B2
(45) Date of Patent: Oct. 23, 2012

(54) TINTED SEMI-FINISHED LENS HAVING IMPACT RESISTANCE AND METHOD FOR MANUFACTURING THE SAME

(75) Inventor: Kazuyuki Miyoshi, Sabae (JP)

(73) Assignee: Miyoshi Industrial Enterprise Inc., Fukui (JP)

( * ) Notice: Subject to any disclaimer, the term of this patent is extended or adjusted under 35 U.S.C. 154(b) by 160 days.

(21) Appl. No.: 12/806,480

(22) Filed: Aug. 13, 2010

(65) Prior Publication Data

US 2011/0063569 A1  Mar. 17, 2011

Related U.S. Application Data

(63) Continuation-in-part of application No. PCT/JP2009/066192, filed on Sep. 16, 2009.

(51) Int. Cl.
  *G02C 7/02* (2006.01)
  *G02C 7/04* (2006.01)
  *G02C 7/10* (2006.01)
(52) U.S. Cl. .............. 351/159.66; 351/159.24
(58) Field of Classification Search .......... 351/159, 351/162, 166, 159.24–159.32, 159.66; 359/642, 359/796
See application file for complete search history.

(56) References Cited

U.S. PATENT DOCUMENTS 7,008,056 B2 * 3/2006 Hartley et al. ............ 351/44

FOREIGN PATENT DOCUMENTS

| JP | H8-216271 | 8/1996 |
| JP | 11-504875 | 5/1999 |
| JP | H11-245259 | 9/1999 |
| JP | 2001-315241 | 11/2001 |
| JP | 2006-168133 | 6/2006 |
| WO | WO 03/008171 | 1/2003 |

* cited by examiner

*Primary Examiner* — Darryl J Collins
(74) *Attorney, Agent, or Firm* — DLA Piper LLP (US)

(57) ABSTRACT

Provided is a method for manufacturing a tinted semi-finished lens that uses polycarbonate, has high light shielding effect, has impact resistance even after polishing, and can have a uniform tint. In particular, in order to provide a tinted semi-finished lens that has the same light shielding at the lens center and the lens edge when a wearer looks through the tinted lens, and furthermore, that seems to have the same light shielding when a third party looks at the wearer, a tinted layer having a uniform thickness and a transparent layer on the back side are integrally formed. Furthermore, in order to provide the impact resistance to either of the resins included in the layers, a low flow resin having a large molecular weight and a short flow length is used. In order to minimize lens distortion and to provide the impact resistance to the lens, the transparent layer employs a resin having the impact resistance, and the transparent layer is formed first and then the tinted layer is formed as an additional layer. Moreover, provided is a method for simultaneously manufacturing two sets of tinted lenses. In the method, two sets of molds are used, a first molded product is obtained in one of the two sets of the molds, and then is transferred to the other mold to form a second molded product, and simultaneously, another first molded product is molded in the first mold.

5 Claims, 10 Drawing Sheets

TINTED SEMI-FINISHED LENS HAVING IMPACT RESISTANCE AND METHOD FOR MANUFACTURING THE SAME

The present application is a Continuation-in-Part application filed based upon PCT International Application No. PCT/JP2009/066192 of Sep. 16, 2009.

FIELD OF THE INVENTION

The present invention relates to a tinted semi-finished lens that has color shade not involving a change in the external appearance, does not have uneven tint when the lens is used, and has impact resistance, even when the lens is polished for lens power. Moreover, the present invention relates to a method for manufacturing a tinted semi-finished lens with a little distortion for stable lens characteristics.

BACKGROUND OF THE INVENTION

Semi-finished lenses using thermoplastic resins save cost and time for the molding and thus are useful. In particular, the polycarbonate semi-finished lenses having impact resistance can resist the impact by a foreign object to protect the eyeballs when the eyeglass frame is worn and thus are useful.

As the thermoplastic resins other than the polycarbonate, polyamide, modified polycarbonate-polyester, thermoplastic polyurethane, and the like also have the impact resistance and thus are suitable. Furthermore, in the case that a composite lens is prepared, when the same resins are used, a special adhesive is not required for the adhesion of both layers. Furthermore, even in the case that the same resins are not used, when resins each having a similar refractive index are used, the adhesion of both layers can be improved and the lens distortion can be prevented as much as possible.

There are the following four methods for manufacturing such tinted semi-finished lenses for sunglasses for light shielding. However, each method has problems.

Method a): The back face of a lens is cut and polished according to the visual acuity of a user, and then the lens is wholly immersed in a stain solution to stain the front and back faces of the lens. In the method, the lens is required to be polished according to a user, and the lens must be stained after the polish. Thus, it needs high cost as well as takes too long time for the lens preparation.

Method b): From the beginning, a whole lens including the front and back faces is stained, and the back face is cut according to the visual acuity of a user. In the method, because the front and back faces are similarly stained, it is unknown how diluted color the lens has by polishing until the polishing is finished. In addition, because the PC material is less stained, when the staining with high density is required, the immersion at high temperature is required to cause the problem of a variable front curve.

Method c): A colorant is mixed with pellets at the time of lens molding to wholly stain a lens with uniform density. In the method, because the back face of the lens is polished according to each user, when the periphery part of the lens has a different thickness from the central part, the absorptivity cannot be constant, for example, the transmission factors are different. In particular, the lens having high light-shielding (low absorptivity) has the problem because the density difference is remarkable.

Method d): A bending process is performed on a tinted sheet on the front curve of a lens to be formed, and the tinted layer is integrally formed on the front face of the lens by an insert molding. The method has problems. For example, because the tinted sheet is required to be separately prepared, it is difficult to respond to color variations. Moreover, because the tinted sheet is required to be cut into a lens shape and to be processed with bending, the lens becomes expensive.

BRIEF SUMMARY OF THE INVENTION

Therefore, it is an object of the present invention to provide a method for manufacturing a tinted semi-finished lens that uses a thermoplastic resin, has high light shielding effect, has impact resistance, and can have a uniform tint even after polishing. In particular, an object of the present invention is to provide a tinted semi-finished lens that has the same light shielding at the lens center and the lens edge when a wearer looks through the tinted lens, and furthermore, that seems to have the same light shielding when a third party looks at the wearer. Furthermore, when two different resins are used, the adhesion between both layers sometimes has trouble. Moreover, in the manufacturing process of both layers, the layers having different thicknesses cause a problem in which, depending on the order of layer formation, effects to the opposing layer, such as deformation and distortion, vary. In particular, when the former layer is thin and the amount of the latter flowed resin is large, the former layer readily melts and flows to cause the distortion.

The thermoplastic resin is preferably polycarbonate. Other preferable resins are polyamide, modified polycarbonate-polyester, thermoplastic polyurethane, and the like because they also have the impact resistance. Furthermore, in the case that a composite lens is prepared, when the same resins are used, a special adhesive is not required for the adhesion of both layers.

Effects of the Invention

Figure 10:
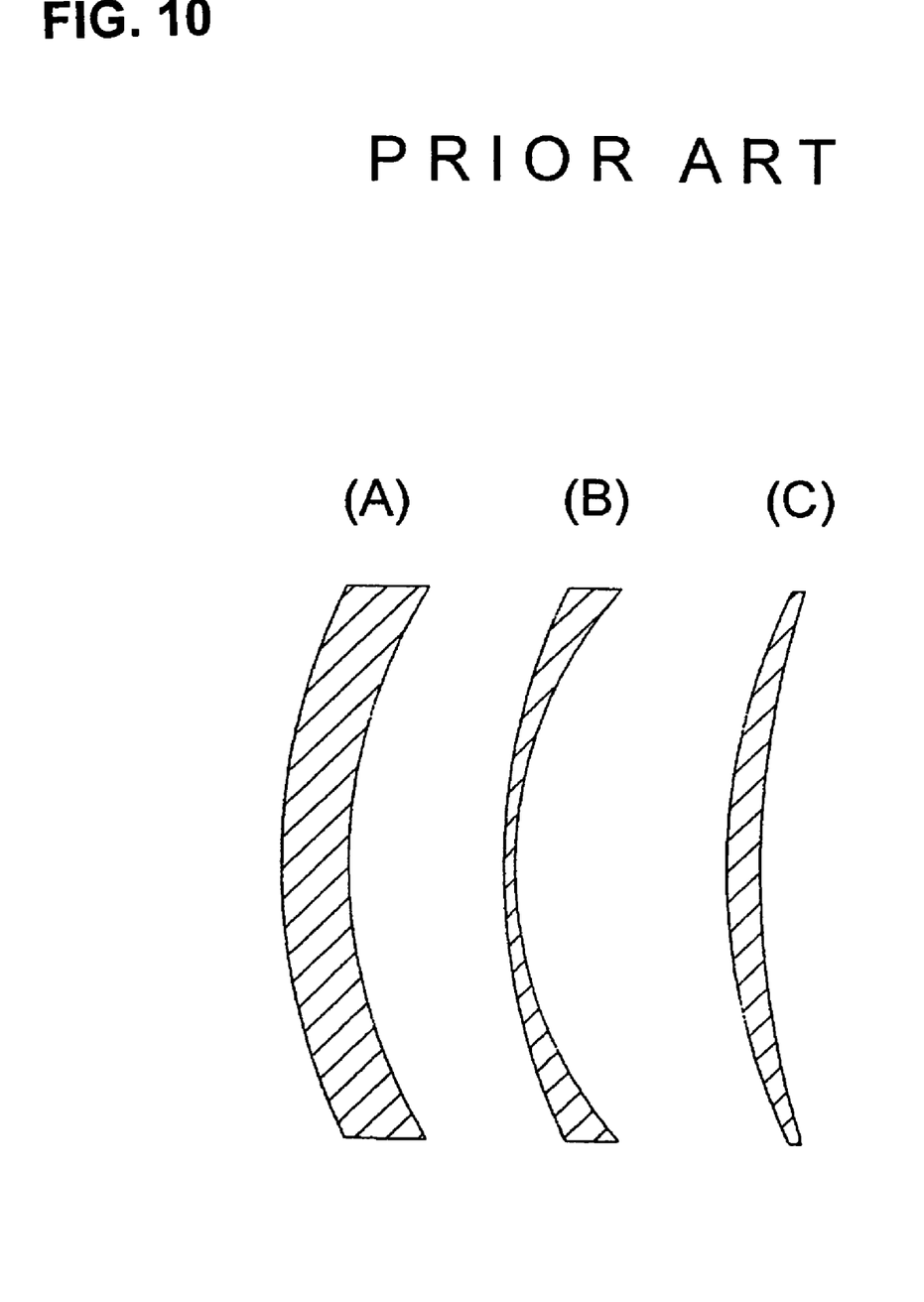
FIG. 10 shows an explanation view of prior art in which the whole lens is semi finished.

Commonly, when the semi-finished lens is processed to have a minus power, as shown in FIG. 10B, the center thickness is defined to be 1.6 mm or more. The reason for this is that a lens having a center thickness of less than 1.6 mm deforms to change the lens power or to be readily broken. While, when the lens is processed to have a plus power, as shown in FIG. 10C, the lens is required to have an edge thickness of 1.6 to 1.7 mm or more for Nylol or of 2 mm or more for full rim frames. Thus, in each case, the lens thickness after polishing is 1.6 mm or more. According to a method in which the tinted layer is uniformly formed within the thickness and a layer for lens power or the like is arranged on the back side of the tinted layer, even when the back layer is polished to the maximum extent by polishing, the tinted layer is not polished, and therefore the tinted layer remains in its original form and the lens can provide the lens power.

Figure 4:
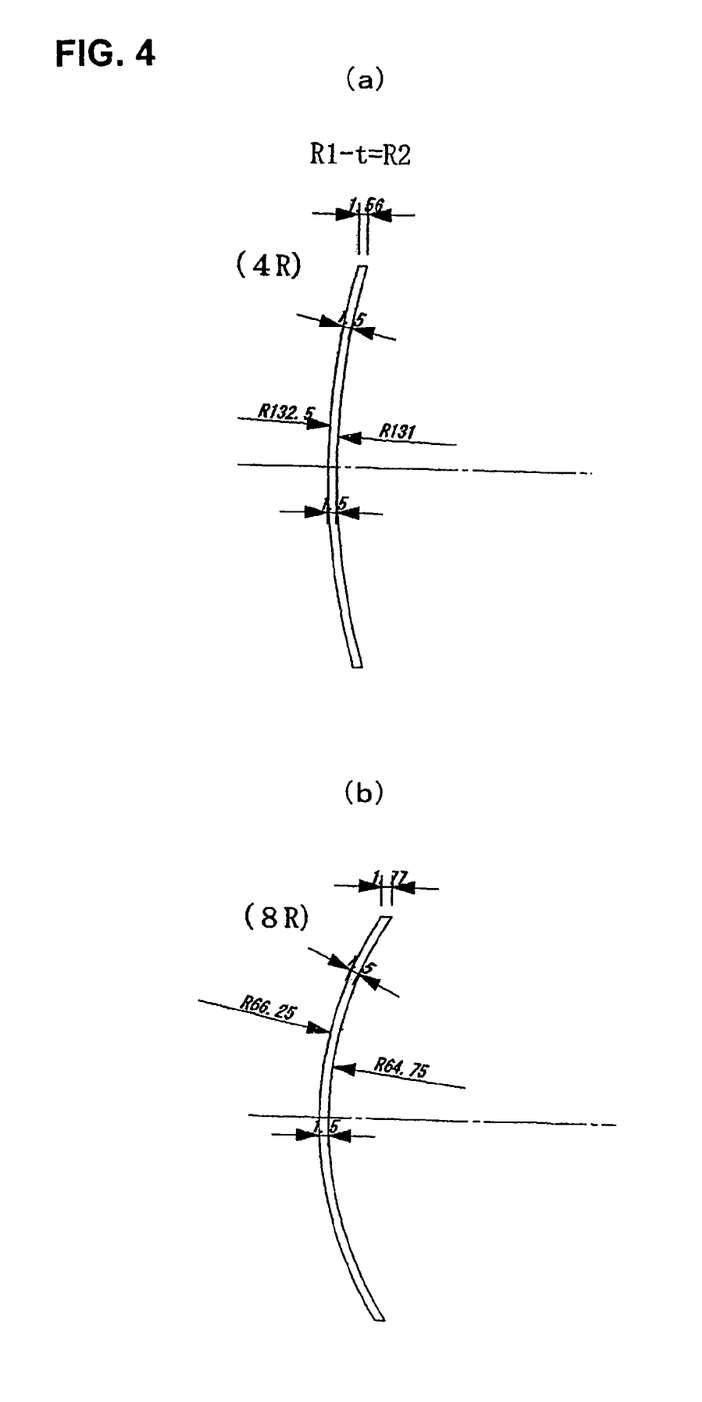
Figure 5:
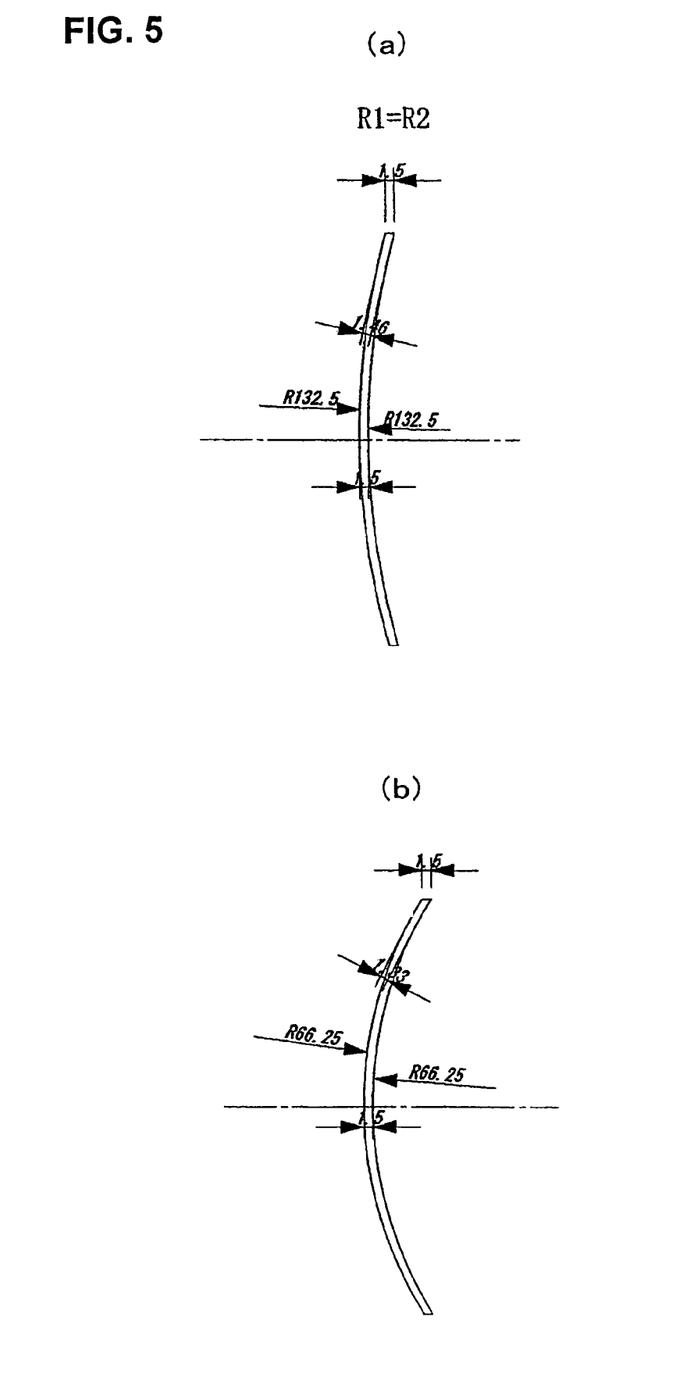

Furthermore, as for the density of the tinted layer, when the tinted layer has a uniform thickness in a horizontal direction (FIG. 5), that is, when the curvature radii are (R1)=(R2), the tint densities are the same from the lens upper part to the lower part even when the lens is viewed from any direction. However, the lens obtains a plus power because the center has a different lens thickness from the periphery. The lens power can be adjusted in the transparent layer on the back side of the tinted layer. However, only a uniform density of the tinted layer should not be essentially required, but a lens shown in FIG. 4 is preferred because it does not affect the lens power. Each of the lenses in FIG. 4 has a uniform lens thickness of 1.5 mm and the difference between the curvature radii is the lens thickness t. In this case, the lens has a uniform lens thickness of 1.5 mm at any position but obtains a minus lens power because of the different curvature radii between the front face and the back face. As shown in FIG. 4 and FIG. 5, a beam that enters from a horizontal direction is refracted to the lens center direction when the beam enters the lens, then goes slightly to the lens center direction, and goes back to the horizontal direction again when the beam goes out from the back face of the lens. Accordingly, the difference of the tint density between the center and the edge (the uppermost part of the lens and the lowest part of the lens) is reduced in the external appearance. In each lens having a small curve (FIG. 4(a) and FIG. 5(a)), the tendency is further reduced. A lens that not only requires the uniform density of the tinted layer but does not affect the lens power is between the lenses in FIG. 4 and FIG. 5. However, because such lens has a thin thickness of 1.5 mm or less, any lens between the lenses in FIG. 4 and FIG. 5 obtains a lens power without any problem.

Figure 6:
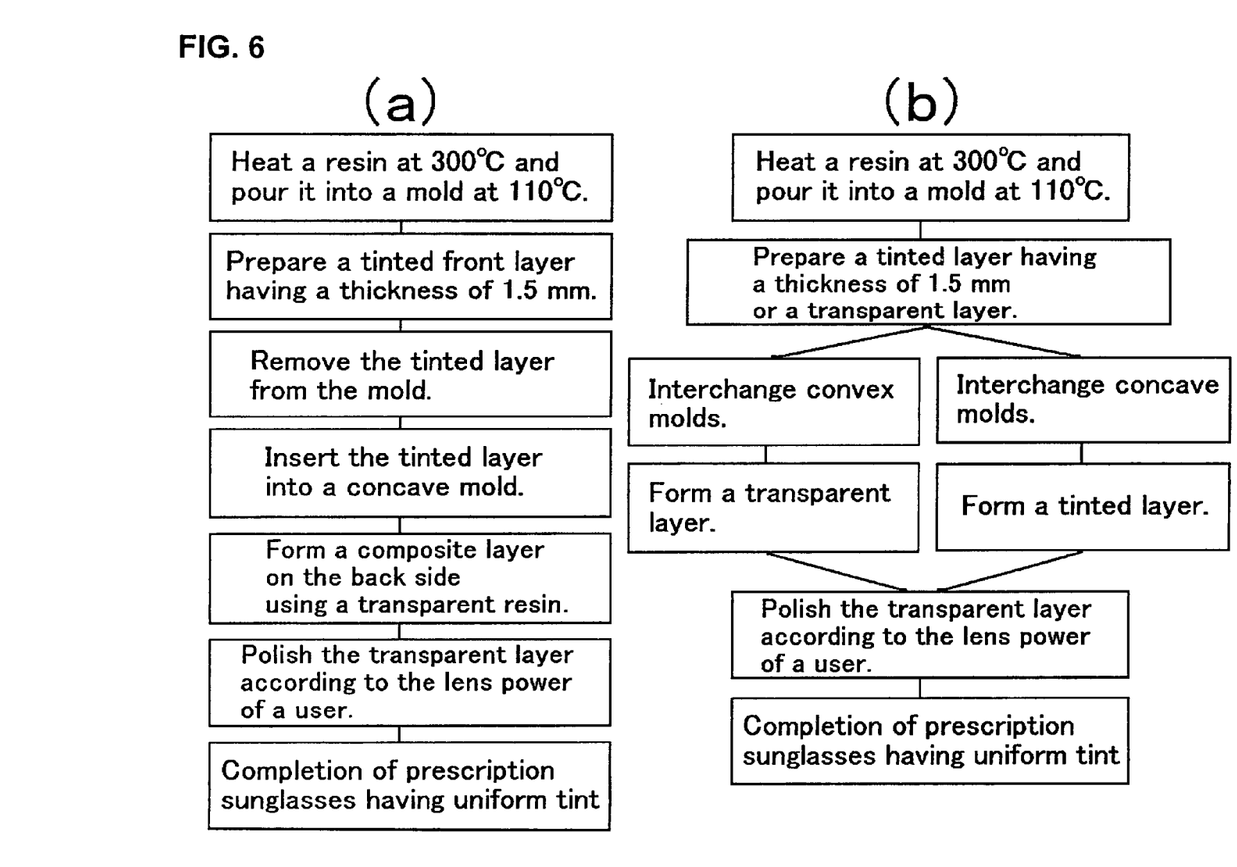

A tinted lens is often once removed from a mold and then inserted in another mold. In this case, because a clearance is readily generated between the convex mold and the molded product having a thickness of 1.5 mm by molding shrinkage and the like and a curved surface of lens is not formed easily, this method can be adopted into high-mix low-volume production. The flow chart of the manufacturing process is shown in FIG. 6(a).

Figure 7:
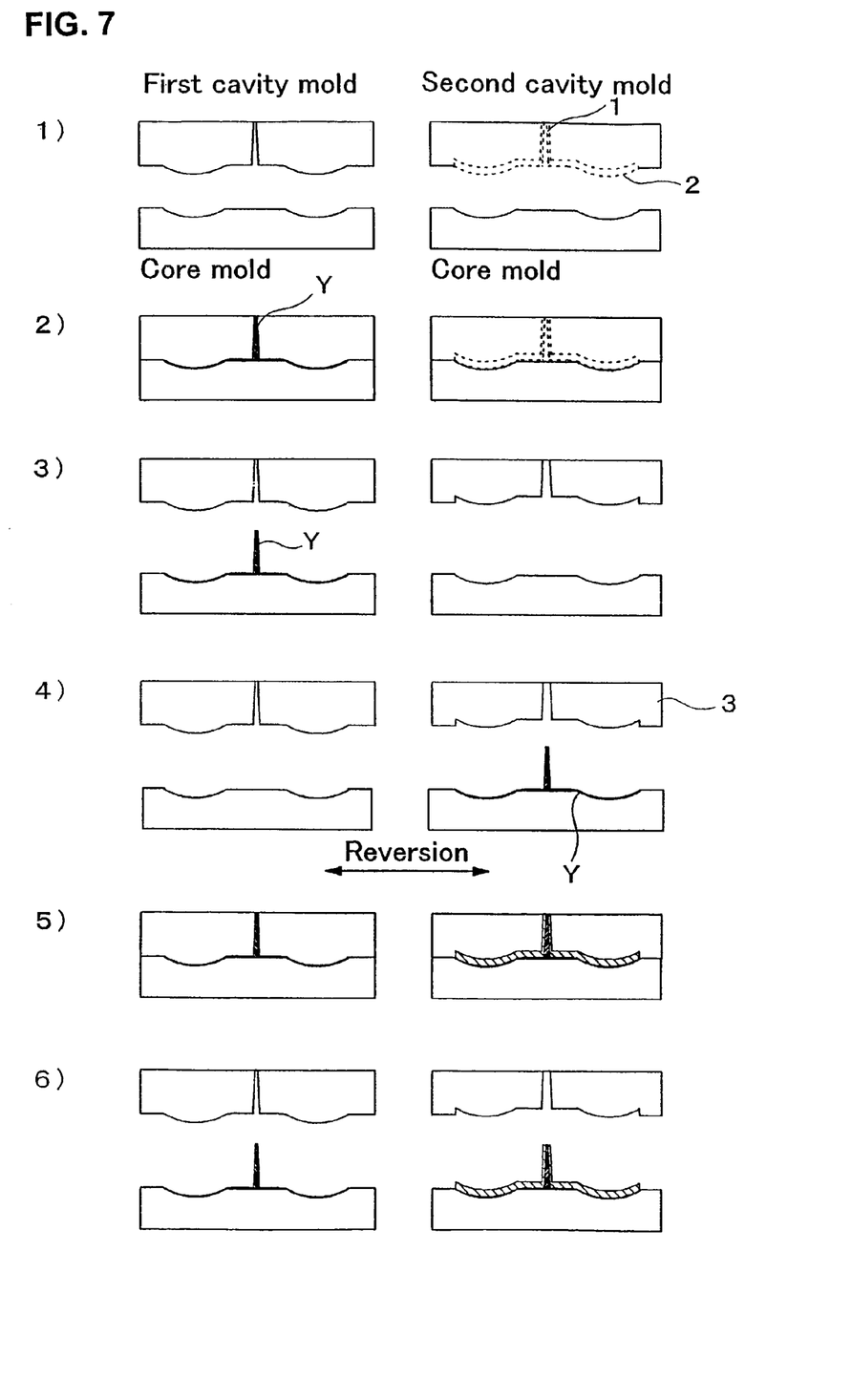
FIG. 7 shows a process drawing the manufacturing of a semi-lens and next replaces a convex mold with a space of transparent layer and forms a united transparent layer.
Figure 8:
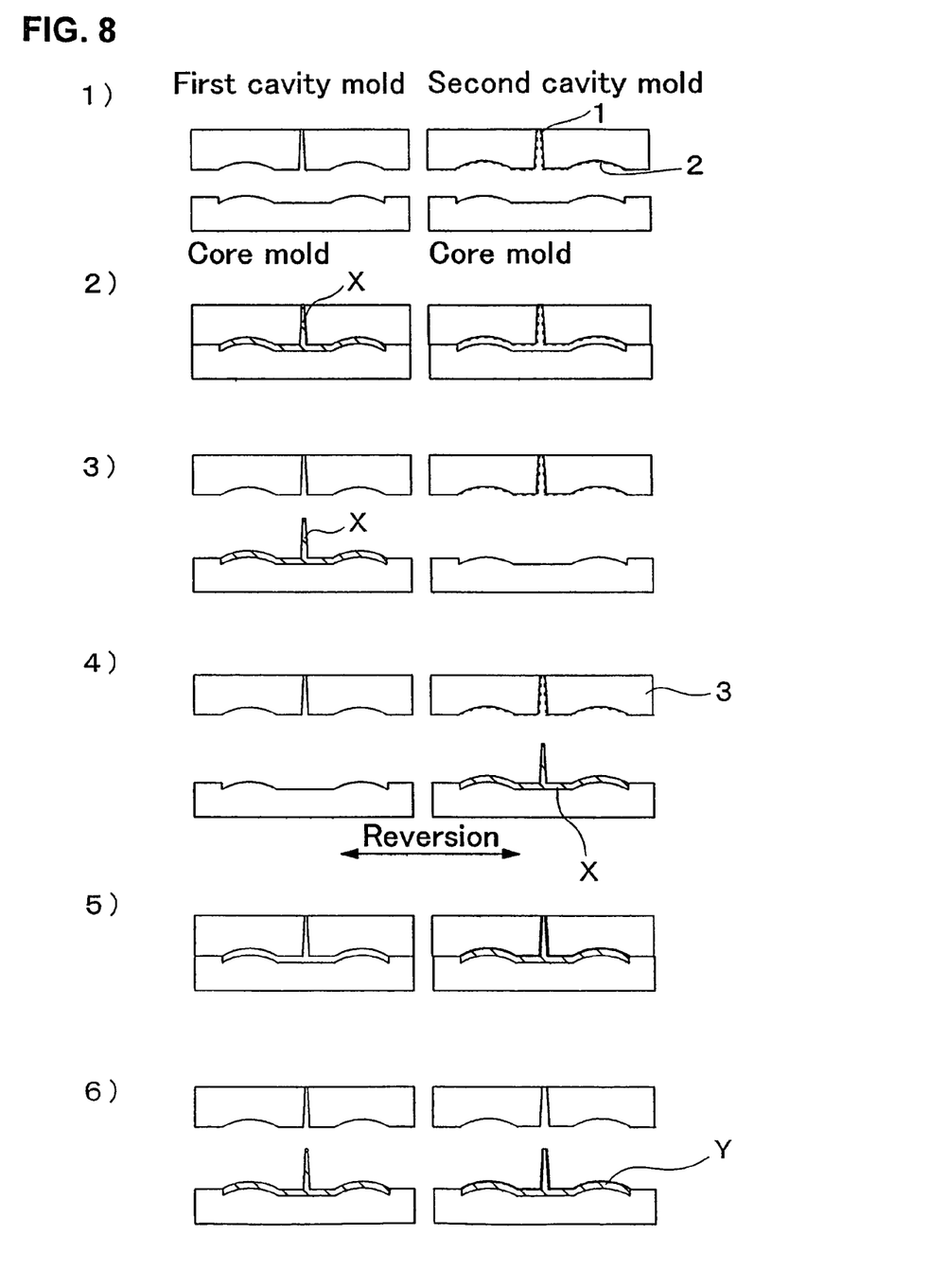
FIG. 8 shows a process drawing the manufacturing of a transparent layer s and next replaces a concave mold with a space of tinted layer and forms a united transparent layer.

Conversely, as shown in FIGS. 7 and 8, when the tinted lens or the transparent layer is not removed from the mold after molding and then molded as is with an interchanged convex mold or concave mold, a clearance is not generated between the molded product and the mold and a stable curve can be generated. The flow chart of the manufacturing process is shown in FIG. 6(b).

The flow length of a commonly used resin affects the impact resistance. A resin having a large molecular weight has a short flow length and low flow ability and thus has excellent impact resistance but poor mold ability (readily generates distortion). In contrast, a resin having a small molecular weight has a long flow length and high flow ability and thus has good mold ability (generates less distortion) but poor impact resistance.

As used herein, "impact resistance" means that, in the drop ball test according to ANSI (American National Standard Institute), when an iron ball is dropped to a lens shaped sample having a center thickness of 1.8 to 2 mm, fragments are not scattered from the impacted lens. In the test, the ball has a weight of 111.6 g (4 oz) and more preferably has a weight of 198 g (7 oz).

Any colorant may be used as long as it has transmission factor without any problem for eyeglasses lenses and can be dispersed in plastic. Examples of the colorant include organic pigments and inorganic pigments that are commonly used for plastic coloring, as well as natural pigments such as melanin, photochromic pigments, neodymium compounds having an absorption band at a particular wavelength in the visible light, ultraviolet light blocking pigments, and infrared light blocking pigments.

According to the tinted semi-finished lens of the present invention, because the tinted layer has a uniform thickness of 1.5 mm, even when the lens is polished for the lens power, the thickness of the tinted layer is not changed. Thus, when a user looks through the lens as well as when a third party looks to the user, the lens seems to have uniform tint and does not have any problem due to uneven tint.

Furthermore, according to the study by the inventors, the experiment reveals that, in the case of the lens having two layers in which the transparent layer is integrally formed on the back side of the front tinted layer, when at least one of the layers satisfies the impact resistance, the whole lens satisfies the impact resistance. Moreover, because the impact resistance relates to the flow length (molecular weight), at the time of two-layer molding, when one of the layers employs the resin having a molecular weight providing the impact resistance, the lens can be manufactured so as to have the impact resistance.

In addition, in the manufacturing method, when the tinted layer or the transparent layer is not removed from a mold and the mold is changed or moved to form few space, an additional layer can be integrally formed on the back side or the front side and the lens distortion is reduced. At this time, when the thin layer is formed in the latter step, the lens can have a little distortion and deformation.

Furthermore, when both resins have the same or similar refractive index, the lens having less distortion can be formed.

BRIEF DESCRIPTION OF THE DRAWINGS

FIG. 4 (a) shows an explanation view of relation between the curvature radius and the thickness of the lens in the low curve.

(b) shows an explanation view of relation between the curvature radius and the thickness of the lens in the high curve.

FIG. 5 (a) shows an explanation view of relation between the curvature radius and the thickness of the lens in the low curve.

(b) shows an explanation view of relation between the curvature radius and the thickness of the lens in the high curve.

FIG. 6 (a) shows a process drawing at the layer formation that removes the lens from the mold, and sets in another mold again, and shows the manufacturing process of accumulating of this invention.

(b) shows a process drawing at the layer formation that not removes the lens from the mold and shows the manufacturing process of accumulating of this invention.

BEST MODE FOR CARRYING OUT THE INVENTION

Hereinafter, embodiments of the present invention will be described in detail.

Example 1

Example 1 of the invention will be described with reference to FIG. 1 and FIG. 2.

Polycarbonate (a molecular weight of 17,000) colored with black ink color having a transmission factor of 25% when the front curve was 8R (a curvature radius of 66.25 mm), the back curve was 8.2R (a curvature radius of 64.75 mm), and the center thickness was 1.5 mm was molded at a resin temperature of 300° C. with a mold at 110° C. to give a tinted molded product having a thickness of 1.5 mm and little distortion.

Figure 1:
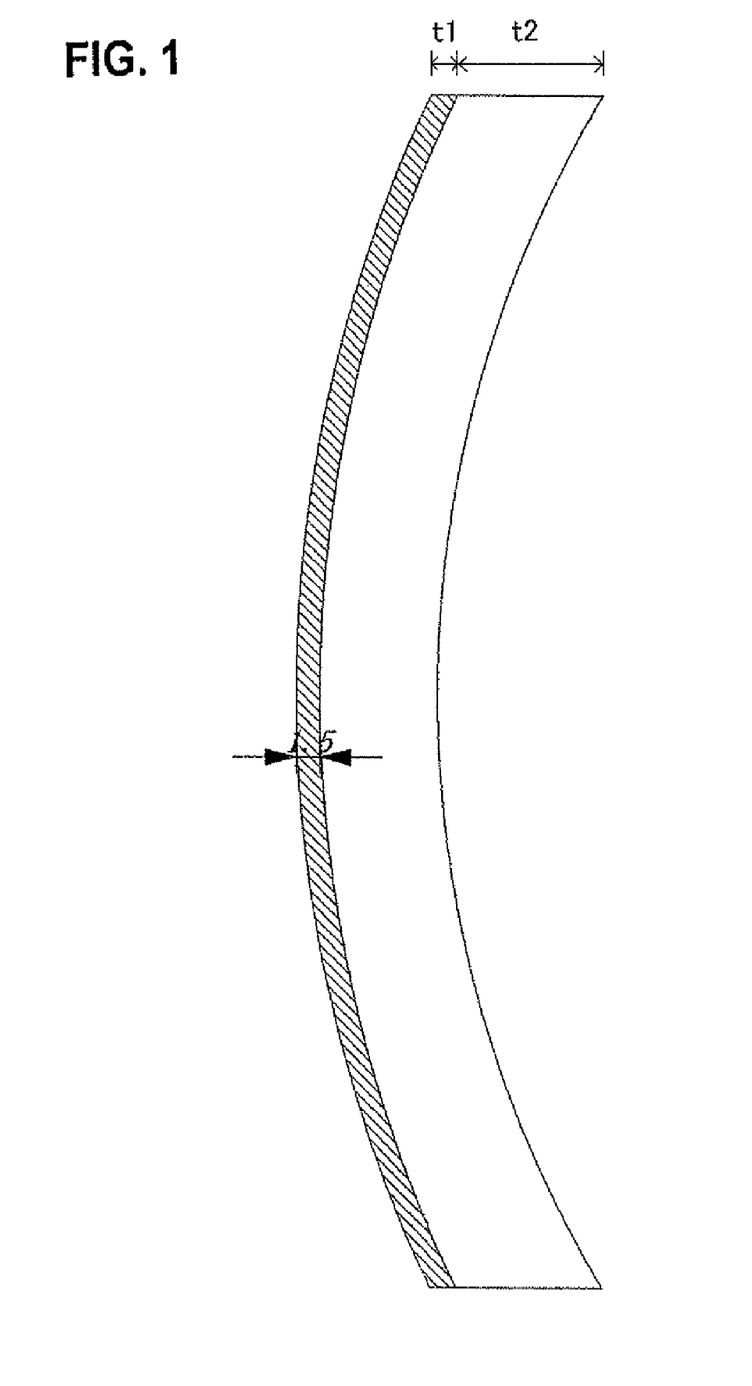
FIG. 1 shows a vertical section view of lens of this invention.
Figure 2:
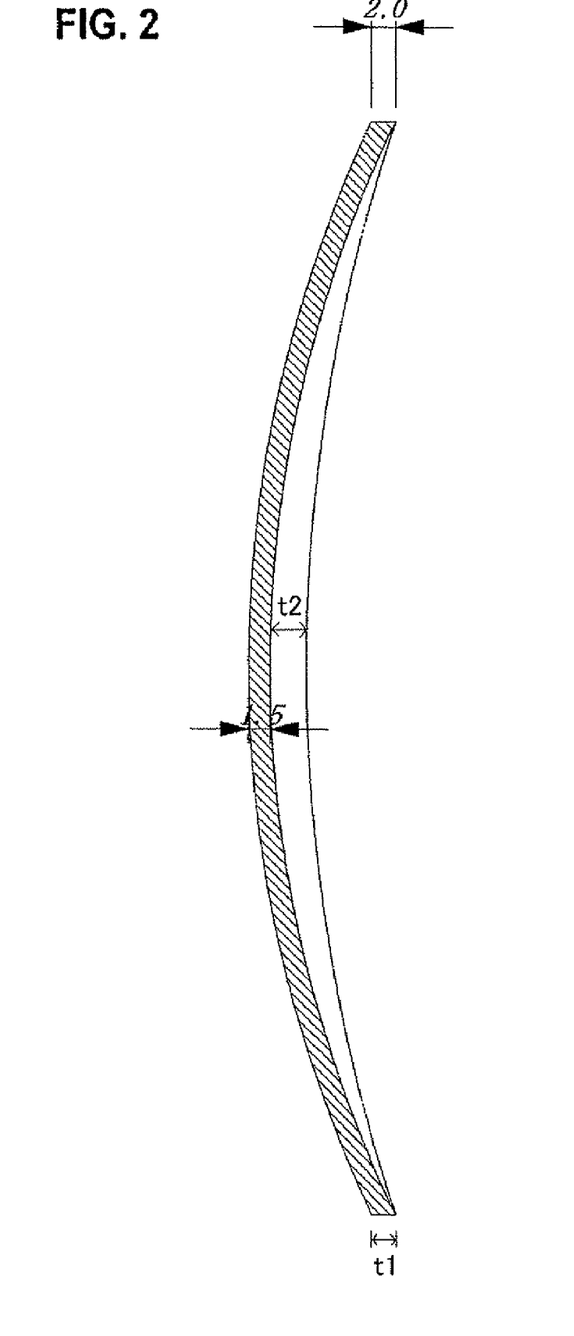
FIG. 2 shows a vertical section view of lens polished as convex lens of this invention.

The obtained molded product was inserted into a concave mold, and to the back side a transparent polycarbonate (a molecular weight of 22,000) layer having a thickness of 8 mm was formed to give a semi-finished lens shown in FIG. 1.

The semi-finished lens obtained in this manner was cut and polished to make a plus power lens having a center thickness of 4.6 mm and a curvature radius of the back curve of 105 mm (5.04R), and then the lens periphery was processed to make a lens shape having a major axis of 58 mm. Thus, a lens having a minimum rim thickness of 2.0 mm shown in FIG. 2 was obtained.

The obtained lens had a uniformly tinted front. Even when a user looked any direction through the lens, the user could equally look in density and, at the same time, when a third party looked to the user, the lens seemed to have a uniform density.

Example 2

The drop ball test according to ANSI (American National Standard Institute) was performed on the obtained lens (an iron ball with a weight of 7 oz was dropped from a height of 50.0 in. to examine fragment scattering due to lens cracking). As a result, the fragment scattering was not observed to prove the impact resistance. In contrast, when the drop ball test was performed on the tinted layer having a thickness of 1.5 mm alone, the fragments were scattered.

Figure 3:
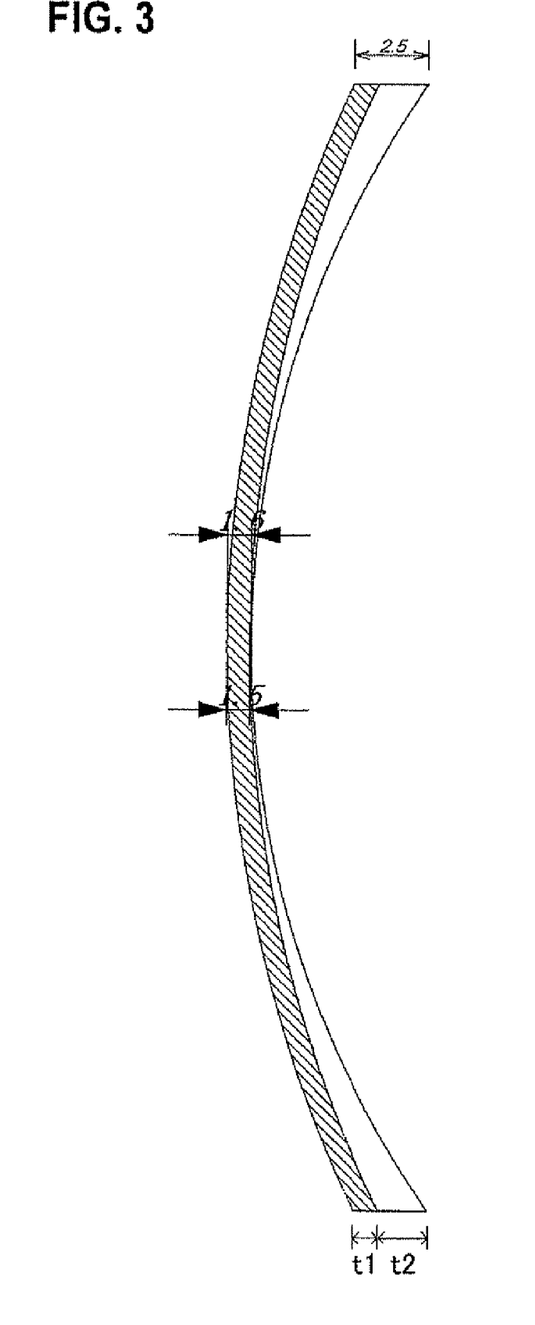
FIG. 3 shows a vertical section view of lens polished as concave lens of this invention.

Example 2 of the present invention will be described with reference to FIG. 1, FIG. 3, and FIG. 7. The efficient method for manufacturing two molded products when two sets of cavity and core molds were prepared for molding will be described in detail in Example 3 with reference to FIG. 8.

Polycarbonate (a molecular weight of 17,000) colored with black ink color having a transmission factor of 25% when the front curve was 8R (a curvature radius of 66.25 mm), the back curve was 8R (a curvature radius of 64.75 mm), and the center thickness was 1.5 mm was molded at a resin temperature of 300° C. and a mold temperature of 130° C. to give a tinted molded product (1) having a thickness of 1.5 mm.

The obtained molded product was not removed from the mold, and then only the convex mold was changed as shown in FIG. 7-4. A transparent resin was molded in the space between the molded product and the convex mold to form a transparent polycarbonate (a molecular weight of 21,000) layer (2) having a thickness of 8 mm to the back side (FIG. 7-5) to give a semi-finished lens shown in FIG. 1.

The obtained semi-finished lens was cut and polished to have a center thickness of 1.6 mm and a curvature radius of the back curve of 58.9 mm (9R), and then the lens periphery was processed to make a lens shape having a major axis of 58 mm. Thus, a lens having a minimum rim thickness of 2.5 mm shown in FIG. 3 was obtained.

The obtained lens had a uniformly tinted front. Even when a user looked any direction through the lens, the user could equally look in density and, at the same time, when a third party looked to the user, the lens seemed to have an almost uniform density.

Example 3

The drop ball test according to ANSI (American National Standard Institute) was performed on the obtained lens (an iron ball with a weight of 7 oz was dropped from a height of 50.0 in. to examine fragment scattering due to lens cracking). As a result, the fragment scattering was not observed to prove the impact resistance.

Example 3

Example 3 of the present invention will be described with reference to FIG. 8.

The method can efficiently provide a lens that has the least distortion and deformation. The method employing two sets of cavity and core molds will be described. The following processes 1) to 6) correspond to the processes in the drawing.

1) Two sets of cavity and core molds for molding were prepared. Each core mold had the same shape in the lens molding part (corresponding to the back face of the lens). The second cavity mold has a larger sprue-runner (1) for pouring resin than the first cavity mold to keep the flow pass for a colored resin. In addition, the second cavity mold had the lens molding part (corresponding to the front face of the lens) that has the same curve as in the first cavity mold and is placed 1.5 mm backward comparing with that in the first cavity mold. (In Fig., the broken lines (2) show the larger part than the first cavity mold)

2) to 3) The core mold and the first cavity mold were closed. A transparent resin was injected and then cooled and solidified in the molds to give the first molded product (X).

3) to 4) The molds were opened. The core mold with the first molded product was inversely transferred to be opposed to the second cavity mold (3).

5) The molds were closed. Through the larger sprue-runner than that of the first cavity mold, a colored resin was poured into the space having a width of 1.5 mm between the first molded product and the second cavity mold, and then cooled and solidified. At this time, as shown in the left figures in 5) and 6), when the transparent resin is simultaneously molded between the first cavity mold and the other core mold, the molding cycle can be accelerated to reduce the cost.

6) The molds were opened to give a polycarbonate semi-finished lens having the tinted layer (Y) with a thickness of 1.5 mm on the front face.

In this manner, when, using two sets of the molds, the transparent layer is prepared with one of the sets and the thin tinted layer is formed to laminate on the prepared transparent layer with the other set, the molded products with a little deformation or distortion in the transparent layer can be continuously manufactured using only two sets of the molds. Thus the method is more efficient.

In Example 4 of the present invention, the impact properties of the whole lens and the distortion after molding were examined depending on the combination of the impact resistances of the front layer and the back layer. The results will be described with reference to Table 1.

As in Examples 1 to 3, in the case where a thin product, for example, having a thickness of 1.5 mm or less (for example, an area of $\phi$76 mm), is molded (especially, in the case where a product having a thickness of 1.2 mm or less is molded), when a polycarbonate with good impact resistance is used for molding, the molding becomes difficult and the molding distortion increases because of its poor flow ability. Thus, it is unfavorable for the lenses.

Therefore, from the viewpoint of the mold ability and the like, in order to obtain the thin molded product, when a resin having good (long) flow ability is used, the molding becomes easier and the obtained molded product has a little distortion. In addition, in order to help the impact resistance in the case, when a resin having good impact resistance is used for the transparent layer, because the lens has a two-layer structure that includes the resin for the back face having the impact resistance even after polishing the transparent layer (for example, when the tinted layer is 1.5 mm or less and the minimum polishing thickness is 1.6 mm or more, the transparent layer (the resin layer having the impact resistance) having a thickness of at least 0.1 mm or more remains), the impact resistance as the lens can be kept.

The following experiment was carried out in order to ascertain the above speculation.

The drop ball test was carried out under each condition using a high flow polycarbonate (H-3000 manufactured by Mitsubishi Engineering-Plastics Corporation, molecular weight: 18,000) and commonly used medium viscosity polycarbonate (S-2000 manufactured by Mitsubishi Engineering-Plastics Corporation, molecular weight: 22,000).
1) Front layer: H-3000 Back face: H-3000
2) Front layer: H-3000 Back face: S-2000
3) Front layer: S-2000 Back face: H-3000
4) Front layer: S-2000 Back face: S-2000

Each lens was molded to have a front layer thickness of 1.3 mm and 8R (curvature radius of 66.25 mm), and then the back face was polished with 10 R (curvature radius of 53 mm), curves so as to have a minimum center thickness of 1.8 mm to prepare a sample. As result, The thickness of front layer is 1.3 mm and back face is 0.5 mm.

The drop ball test was carried out on each polished lens.

TABLE 1

|  |  | 1) Front layer H-3000 Back face H-3000 | 2) Front layer H-3000 Back face S-2000 | 1) Front layer S-2000 Back face H-3000 | 1) Front layer S-2000 Back face S-2000 |
|---|---|---|---|---|---|
| Drop ball test | 111.6 g | Δ cracked, fragments were not scattered | ○ not cracked | ○ not cracked | ○ not cracked |
|  | 196 g | X cracked, fragments were scattered | ○ front layer was cracked | ○ not cracked | ○ not cracked |
| Distortion after molding |  | a very little | a little | large | large |

From the above result, the lenses 2), 3), and 4) are the composite layered tinted lenses from which crack fragments were not scattered. That is, it is apparent that, when either the front layer or the back layer employs the resin having the impact resistance, the lens having the impact resistance can be obtained. The lens of the present invention has the good result in the impact resistance when the resin (having a short flow length and impact resistance) for the transparent layer remains on the back side after molding two layers.

From the result, it is more preferable that the lens is composed of two layers including the tinted layer having the resin with a long flow length (the resin with poor impact resistance) and the transparent layer having the resin with a short flow length (the resin with good impact resistance). The flow length and the impact resistance of polycarbonate commonly depend on the molecular weight of the resin. The resin having a large molecular weight has a short flow length and the resin having a small molecular weight has a long flow length and poor impact resistance. Preferred polycarbonate has a molecular weight of less than 20,000 for the tinted layer or a molecular weight of 20,000 or more for the transparent layer.

A high flow (L1) polycarbonate has a molecular weight of less than 20,000, and a low flow (L2) polycarbonate has a molecular weight of 20,000 or more. The distortion after molding is generated when the front layer is formed (thin film molding). Thus, when the front layer employs a resin having good flow ability, the distortion is reduced.

Comparative Example 1

Polycarbonate colored with black ink color having a transmission factor of 25% when the front curve was 8R (a curvature radius of 66.25 mm), the back curve was 10R (a curvature radius of 53 mm), and the thickness was 1.6 mm was molded at a resin temperature of 300° C. and a mold temperature of 110° C. to give a semi-finished lens having a center thickness of 10 mm. The back face of the obtained semi-finished lens was polished so as to have a center thickness of 1.6 mm, a major axis of 58 mm, and a rim thickness of 3.6 mm as shown in FIG. 10.

The obtained lens had the center part with lighter color than the peripheral part because the center part was polished to a tint thickness of 1.6 mm, and thus had uneven tint.

Furthermore, when the sunglasses were used, the tint degree varied depending on direction. The front direction seemed light and the peripheral direction seemed dark. Moreover, when a third party looked at the wearer, the light blocking density did not seem uniform.

Comparative Example 2

Figure 9:
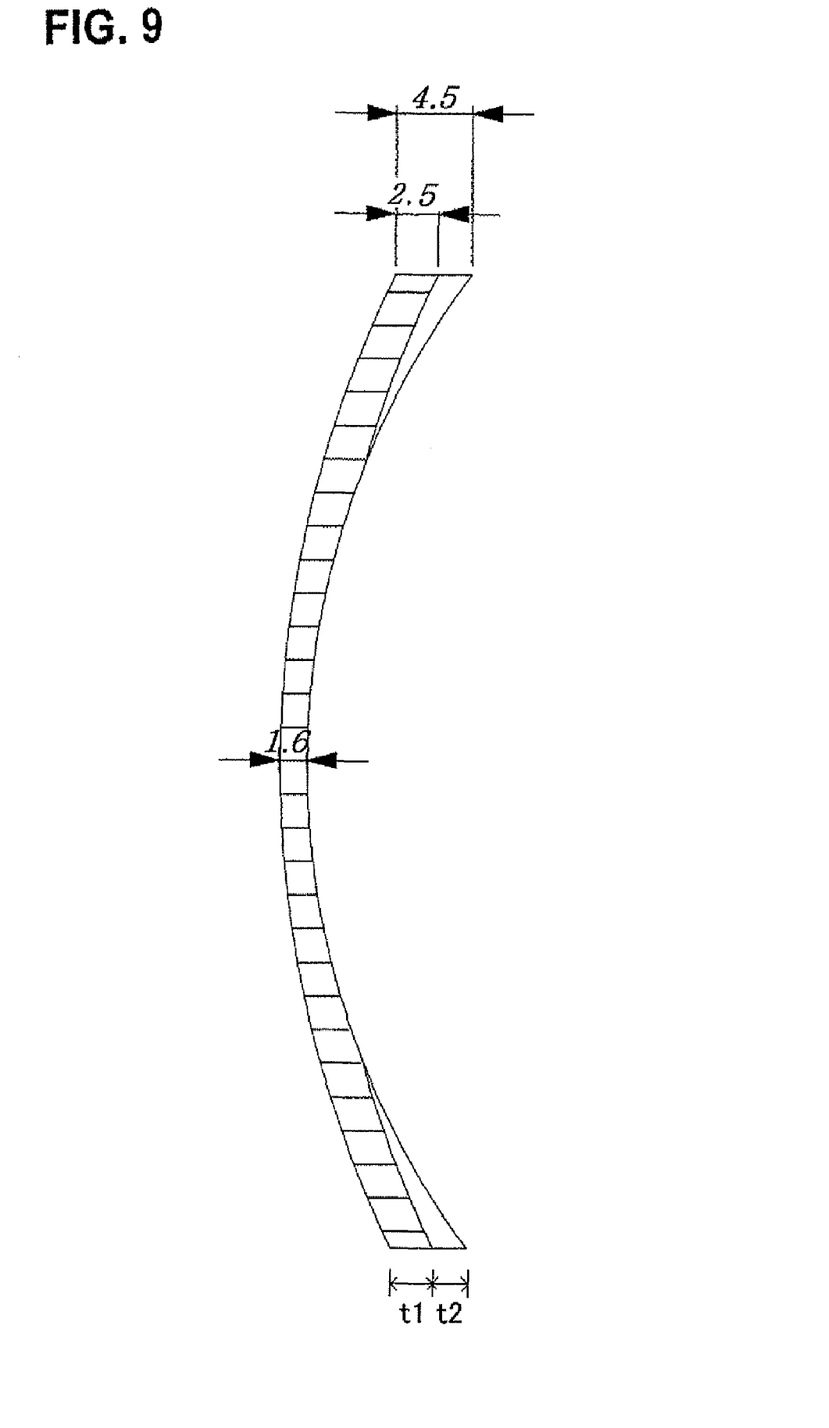
FIG. 9 shows an explanation of comparative example.

Polycarbonate colored with black ink color having a transmission factor of 25% when the front curve was 8R (a curvature radius of 66.25 mm), the back curve was 8R (a curvature radius of 66.25 mm), and the thickness was 1.6 mm was molded at a resin temperature of 300° C. and a mold temperature of 110° C. to give a tinted lens having a thickness of 2.5 mm. Furthermore, a transparent resin was molded on the back side of the obtained tinted lens to give a semi-finished lens having a thickness of 10 mm. The back face of the obtained semi-finished lens was polished so as to have a center thickness of 1.6 mm, a major axis of 58 mm, and a rim thickness of 4.5 mm to give a lens as shown in FIG. 9.

In the obtained lens, because the transparent layer remained on the periphery part (a tinted layer thickness of 2.5 mm) and the tinted layer was polished to a thickness of 1.6 mm at the center part, the tint density near the center part was lighter than that of the peripheral part and the lens had uneven tint.

The drop ball test according to ANSI (American National Standard Institute) (an iron ball with a weight of 7 oz was dropped from a height of 50.0 in. to examine fragment scattering due to lens cracking) was performed on the obtained polished lens. As a result, the fragment scattering due to lens cracking was observed.

What is claimed is:

1. A tinted semi-finished lens comprising:
a transparent layer including a resin material;
a tinted layer including a resin material;
the resin included in the transparent layer having a flow length of L2 and the transparent layer having a thickness of t2;
the resin included in the tinted layer having a flow length of L1 and the tinted layer having a thickness of t1;
L2<=L1 and t2<t1 being satisfied; and
the transparent layer being formed and thereafter the tinted layer being formed as an additional layer.

2. The tinted semi-finished lens according to claim 1, wherein at least one of the resin included in the tinted layer and the resin included in the transparent layer has impact resistance.

3. The tinted semi-finished lens according to claim 1, wherein, when a curvature radius of a front curve of the tinted layer is R1 and a thickness of the tinted layer is t1, a curvature radius R2 of a back curve of the tinted layer satisfies R1−t1<=R2<=R1, and a thickness of a center part of the tinted layer is 1.5 mm or less.

4. A tinted semi-finished lens, comprising:
a polycarbonate tinted layer having a uniform thickness on a front side of the lens;
a polycarbonate transparent layer on a back side of the lens;
and the tinted layer and the transparent layer being integrally formed, and wherein,
when a curvature radius of a front curve of the tinted layer is R1 and a thickness of the tinted layer is t1, a curvature radius R2 of a back curve of the tinted layer satisfies R1−t1<=R2<=R1, and a thickness of a center part of the tinted layer is 1.5 mm or less.

5. A tinted semi-finished lens comprising:
a polycarbonate tinted layer having a uniform thickness on a front side of the lens;
a polycarbonate transparent layer on a back side of the lens; and
the tinted layer and the transparent layer being integrally formed and wherein,
at least one of the polycarbonate included in the tinted layer and the polycarbonate included in the transparent layer has impact resistance, and
when a curvature radius of a front curve of the tinted layer is R1 and a thickness of the tinted layer is t1, a curvature radius R2 of a back curve of the tinted layer satisfies R1−t1<=R2<=R1, and a thickness of a center part of the tinted layer is 1.5 mm or less.

* * * * *